United States Patent
Mahajan et al.

(10) Patent No.: US 10,698,722 B2
(45) Date of Patent: Jun. 30, 2020

(54) VIRTUAL MACHINE MIGRATION ACROSS CLOUD COMPUTING PROVIDERS

(71) Applicant: SAP SE, Walldorf (DE)

(72) Inventors: Sushant Mahajan, Bangalore (IN); Vivek Anand T. Kallampally, Bangalore (IN)

(73) Assignee: SAP SE, Walldorf (DE)

( * ) Notice: Subject to any disclaimer, the term of this patent is extended or adjusted under 35 U.S.C. 154(b) by 81 days.

(21) Appl. No.: 16/200,968

(22) Filed: Nov. 27, 2018

(65) Prior Publication Data
US 2020/0167177 A1    May 28, 2020

(51) Int. Cl.
*G06F 9/455* (2018.01)
*H04L 9/30* (2006.01)

(52) U.S. Cl.
CPC ............ *G06F 9/45558* (2013.01); *H04L 9/30* (2013.01); *G06F 2009/4557* (2013.01); *G06F 2009/45583* (2013.01); *G06F 2009/45587* (2013.01); *G06F 2009/45595* (2013.01)

(58) Field of Classification Search
CPC ... G06F 2009/4557; G06F 2009/45583; G06F 2009/45587; G06F 2009/45595; G06F 9/45558; H04L 9/30
See application file for complete search history.

(56) References Cited

U.S. PATENT DOCUMENTS

| | | | | |
|---|---|---|---|---|
| 8,370,473 B2 * | 2/2013 | Glikson | ............... | G06F 9/4856 709/223 |
| 9,389,893 B2 * | 7/2016 | Raghu | ............... | G06F 9/45533 |
| 9,886,352 B2 * | 2/2018 | Al-Kiswany | ....... | G06F 11/1464 |
| 10,534,921 B2 * | 1/2020 | Tsirkin | .................... | G06F 21/78 |
| 2012/0167081 A1 * | 6/2012 | Sedayao | ............. | G06F 11/3495 718/1 |
| 2013/0298122 A1 * | 11/2013 | Rangegowda | ...... | G06F 9/45558 718/1 |
| 2014/0165063 A1 * | 6/2014 | Shiva | .................. | G06F 9/45533 718/1 |

(Continued)

OTHER PUBLICATIONS

Celesti et al., "Improving Virtual Machine Migration in Federated Cloud Environments" (Year: 2010).*

(Continued)

*Primary Examiner* — Phillip H Nguyen
(74) *Attorney, Agent, or Firm* — Buckley, Maschoff & Talwalkar LLC

(57) ABSTRACT

A first cloud computing provider may execute a virtual machine, and an automated migration platform may access the first provider data center using a secure shell with key-based access by providing a public encryption key. The automated migration platform may use a data duplicator command to stream block level copies of the virtual machine (and the stream of block level copies may be compressed before being stored at a storage location). Resource requirements, including a volume size, of the virtual machine may be automatically determined and used to create a new empty volume at a second cloud computing provider. The compressed stream of block level copies from the storage location may be extracted into the new empty volume. A new virtual machine may then be spawned at the second cloud computing provider having the new volume as a root volume. The new virtual machine may then be started.

20 Claims, 9 Drawing Sheets

(56) References Cited

U.S. PATENT DOCUMENTS

2015/0244802 A1* 8/2015 Simoncelli .......... G06F 9/45558
709/219
2018/0024854 A1* 1/2018 Wang ..................... F41A 33/06
2018/0329737 A1* 11/2018 Dong .................. G06F 9/45558

OTHER PUBLICATIONS

Admad et al., "Virtual machine migration in cloud data centers: a review, taxonomy, and open research issues" (Year: 2015).*

* cited by examiner

| MIGRATION IDENTIFIER 702 | VIRTUAL MACHINE IDENTIFIER 704 | SOURCE PROVIDER IDENTIFIER 706 | TARGET PROVIDER IDENTIFIER 708 | MIGRATION DATE (TIME) 710 | STATUS 712 |
| --- | --- | --- | --- | --- | --- |
| M_101 | VM_123 | P_101 | P_102 | 13 JULY 2002 (04:30:00) | MIGRATED |
| M_102 | VM_456 | P_101 | P_103 | 14 JULY 2022 (11:15:00) | MIGRATED |
| M_103 | VM_789 | P_104 | P_105 | 15 JULY 2022 (13:00:00) | IN PROCESS |
| M_104 | VM789 | P_105 | P_104 | 15 JULY 2022 (14:00:00) | PENDING |

VIRTUAL MACHINE MIGRATION ACROSS CLOUD COMPUTING PROVIDERS

BACKGROUND

A user or enterprise may execute a virtual machine using a cloud computing provider data center. The virtual machine might, for example, run a service or application for an enterprise (e.g., to handle a human resources task, process purchase order, etc.). In some cases, a user might want to move (or "migrate") the virtual machine from one cloud computing provider to another cloud computing provider (e.g., a less costly or more reliable provider). Making such a change, however, can require a manual process that is costly, time-consuming and error prone (e.g., an administrator might have to investigate both the existing and new computing environments, adjust various parameters, initiate multiple steps to copy information to the new provider, etc.).

It would therefore be desirable to provide for the automatic migration of a virtual machine from one cloud computing provider to another in a fast, automatic, and accurate manner.

SUMMARY

According to some embodiments, methods and systems may include a first cloud computing provider may execute a virtual machine, and an automated migration platform may access the first provider data center using a secure shell with key-based access by providing a public encryption key. The automated migration platform may use a data duplicator command to stream block level copies of the virtual machine (and the stream of block level copies may be compressed before being stored at a storage location). Resource requirements, including a volume size, of the virtual machine may be automatically determined and used to create a new empty volume at a second cloud computing provider. The compressed stream of block level copies from the storage location may be extracted into the new empty volume. A new virtual machine may then be spawned at the second cloud computing provider having the new volume as a root volume. The new virtual machine may then be started.

Some embodiments comprise: means for arranging, by an automated migration platform, to access the first cloud computing provider data center using a secure shell with key-based access by providing a public encryption key; means for using a data duplicator command to stream block level copies of the virtual machine from the first cloud computing provider data center; means for compressing the stream of block level copies before storing at a storage location; means for automatically determining resource requirements, including a volume size, of the virtual machine; means for creating a new empty volume at a second cloud computing provider data center in accordance with the determined volume size; means for extracting the compressed stream of block level copies from the storage location into the new empty volume; means for spawning a new volume to the new virtual machine at the second cloud computing provider data center in accordance with the determined resource requirements and having the new volume attached as a root volume; and means for starting the new virtual machine.

Some technical advantages of some embodiments disclosed herein are improved systems and methods to provide for the automatic migration of a virtual machine from one cloud computing provider to another in a fast, automatic, and accurate manner.

BRIEF DESCRIPTION OF THE DRAWINGS

FIG. 7 is portion of a tabular migration data store in accordance with some embodiments.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
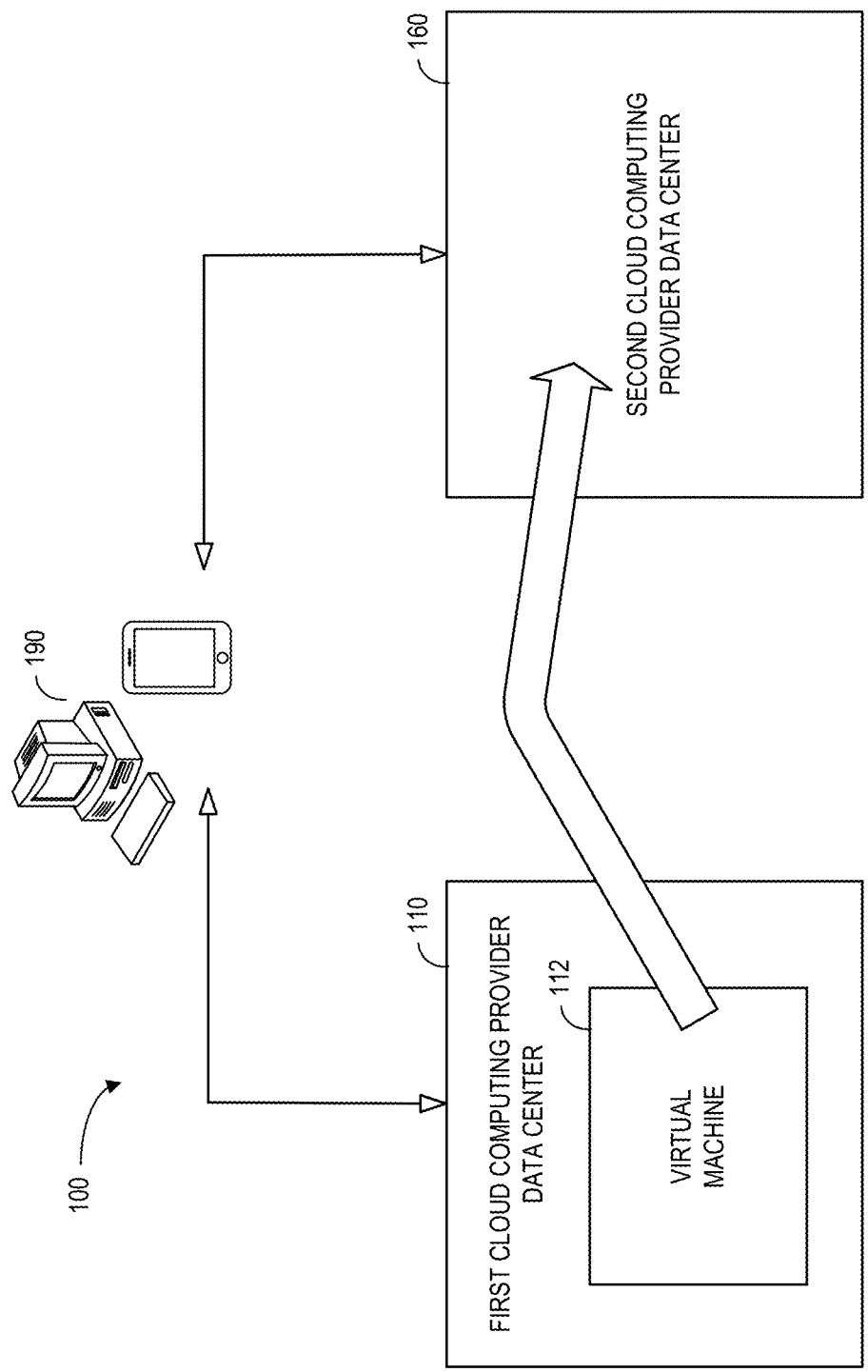
FIG. 1 is a high-level block diagram of a system.

FIG. 1 is a high-level block diagram of a system 100. The system 100 includes a first "cloud computing" provider data center 110. As used herein, the phrase "cloud computing" may refer to any shared pools of configurable computer system resources and higher-level services that can be rapidly provisioned with minimal management effort (e.g., via the Internet). The first cloud computing provider data center 110 is executing a "virtual machine 112. As used herein, the phrase "virtual machine" may refer to an emulation of a computer system that is based on a computer architecture and provides the functionality of a physical computer (e.g., to provide a service or run an application for an enterprise).

In some cases, a user might want to change to a second cloud computing provider data center 160 for business or technological reasons. For example, a user may have already decided to move to a new provider and wants to move a number of virtual machine from the current provider to the new provider. As another example, a user might want to try out a new provider to check if it can handle the virtual machine workload (e.g., to see if everything works as intended).

Currently, however, there is no direct way to make such a move in a seamless manner. Instead, an Information Technology ("IT") at a remote device 190 needs to manually investigate the situation and manually move various components from the first provider 110 to the second provider 160 to migrate the virtual machine 112. Consider, for example, two providers: A and B. To move a virtual machine from A to B, the user may not have any seamless solution because the backup facilities provided by the providers are typically not compatible. Some of the issues may be genuine while others may result from the use of proprietary protocols and storage standards (which aren't interoperable across providers). For example, provider A might offer the creation and use of snapshots which are pointer based while provider B uses snapshots with actual data. As another example, provider A might offer a way to download the entire virtual machine as a file, but that file usually is not acceptable by provider B. Note that manually using the remote device 190 to migrate the virtual machine 112 may be a time-consuming, expensive, and error-prone process, especially when a substantial number of virtual machines 112 need to be migrated and/or the migrations occur on a relatively frequent basis.

Figure 2:
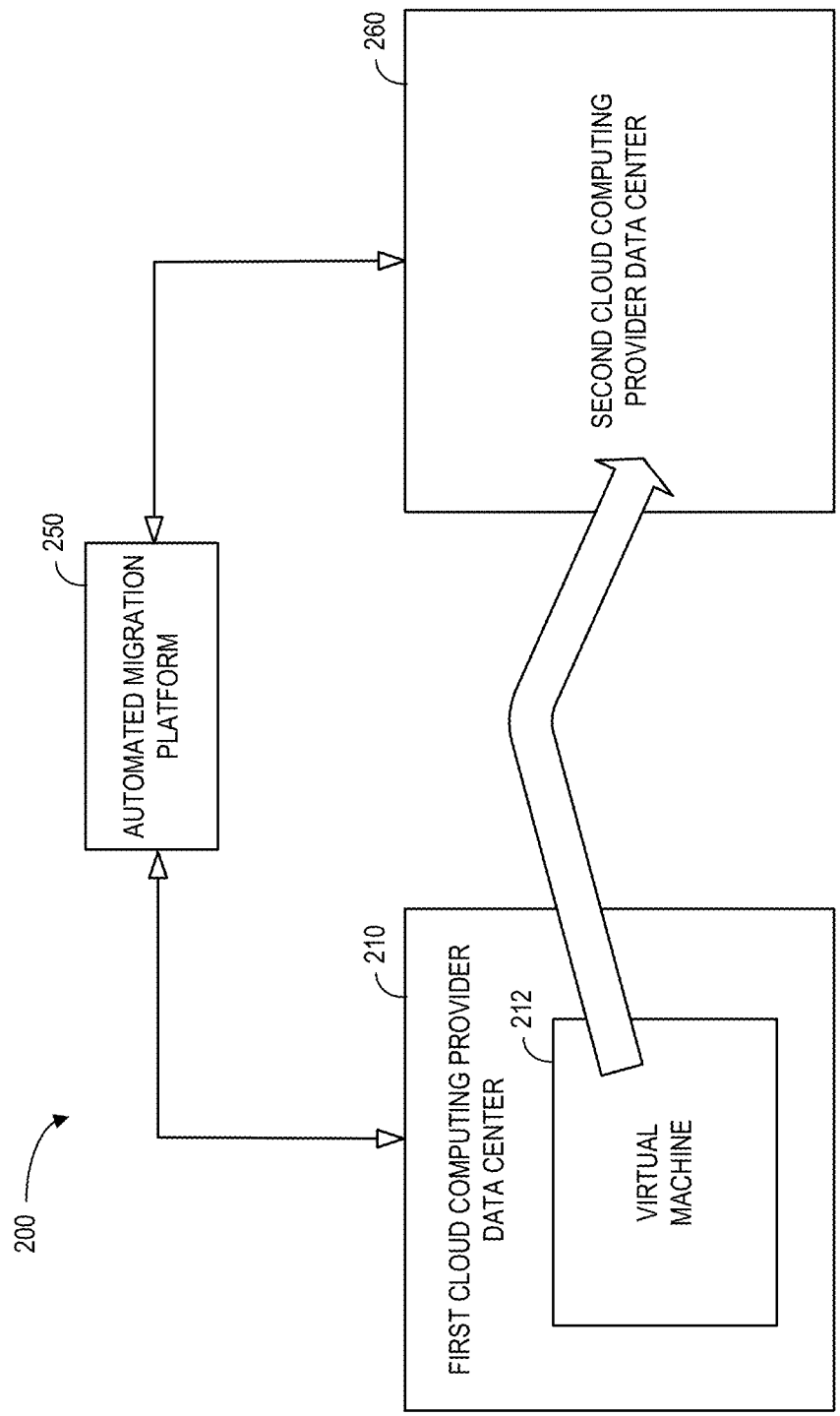
FIG. 2 is a high-level block diagram of a system in accordance with some embodiments.

To avoid such problems, FIG. 2 is a high-level block diagram of a system 200 in accordance with some embodiments. The system 200 includes an automated migration platform 250 that facilitates the replication or migration of a virtual machine 212 from a first cloud computing provider data center 210 to a second cloud computing data center 260. The process might be performed automatically or be initiated via a simple command from a remote operator interface device. As used herein, the term "automatically" may refer to, for example, actions that can be performed with little or no human intervention.

As used herein, devices, including those associated with the system 200 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The automated migration platform 250 may store information into and/or retrieve information from various data stores, which may be locally stored or reside remote from the automated migration platform 250. Although a single automated migration platform 250 is shown in FIG. 2, any number of such devices may be included. Moreover, various devices described herein might be combined according to embodiments of the present invention. For example, in some embodiments, the first cloud computing provider data center 210 and the automated migration platform 250 might comprise a single apparatus. The system 200 functions may be performed by a constellation of networked apparatuses, such as in a distributed processing or cloud-based architecture.

A user may access the system 200 via a remote device (e.g., a Personal Computer ("PC"), tablet, or smartphone) to view information about and/or manage operational information in accordance with any of the embodiments described herein. In some cases, an interactive graphical user interface display may let an operator or administrator define and/or adjust certain parameters (e.g., to direct or initiate migration of the virtual machine 212) and/or provide or receive automatically generated recommendations or results from the system 200.

Figure 3:
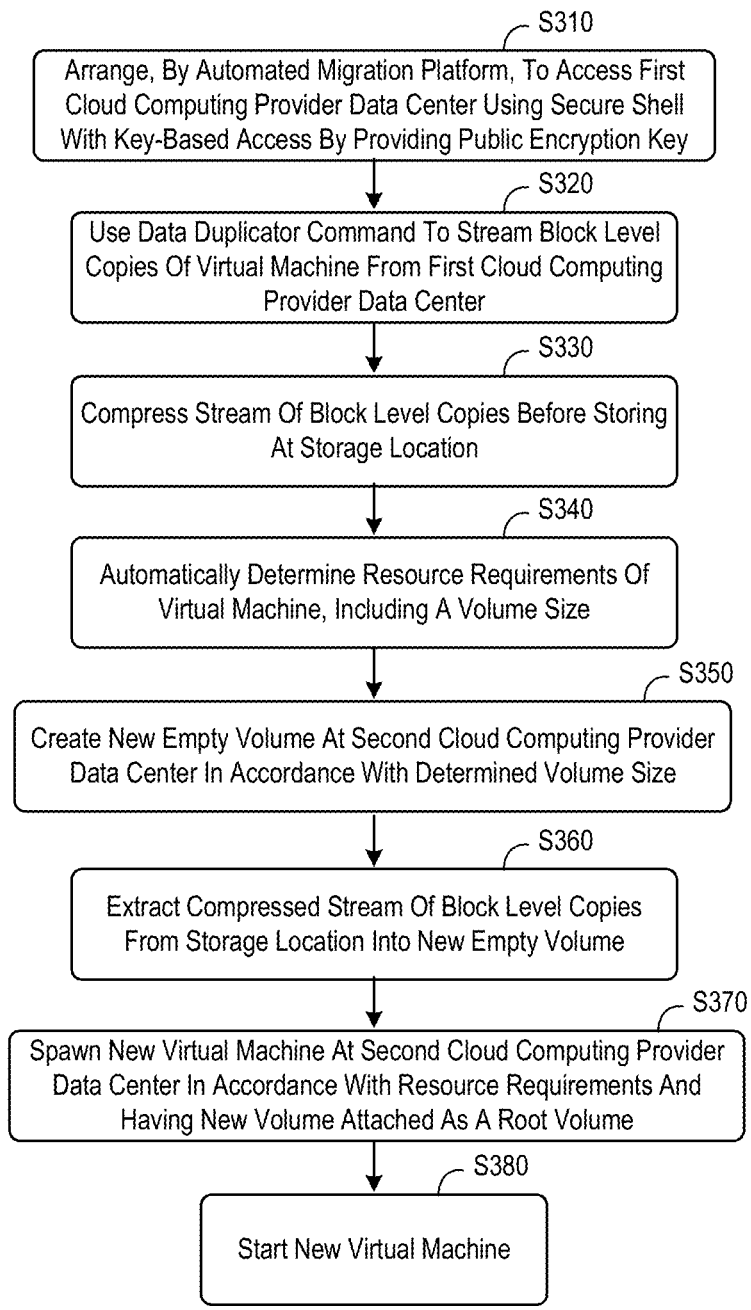
FIG. 3 is a method according to some embodiments.

FIG. 3 is a method that might performed by some or all of the elements of the system 200 described with respect to FIG. 2. The flow charts described herein do not imply a fixed order to the steps, and embodiments of the present invention may be practiced in any order that is practicable. Note that any of the methods described herein may be performed by hardware, software, an automated script of commands, or any combination of these approaches. For example, a computer-readable storage medium may store thereon instructions that when executed by a machine result in performance according to any of the embodiments described herein.

Refer again to the two providers A and B, and a Linux based virtual machine on provider A that needs to be replicated on provider B. According to some embodiments, a block-level copy of the virtual machine may be taken and transmitted to provider B where the copy may be used to spawn a new virtual machine (with the same data and Operating System ("OS" as the original virtual machine) as follows. At S310, an automated migration platform may arrange to access a first cloud computing provider data center using a secure shell with key-based access by providing a public encryption key. According to some embodiments, at least one of the first and second cloud computing data provider data center is associated with an Infrastructure-as-a-Service ("IaaS") data center that provides high-level Application Programming Interfaces ("APIs") to de-reference various low-level details of an underlying network infrastructure like physical computing resources, location, data partitioning, scaling, security, backup, etc. According to some embodiments, one or more of the provider data centers are associated with a Platform-as-a-Service ("PaaS") data center that provides a platform allowing user to develop, run, and manage applications without the complexity of building and maintaining the infrastructure typically associated with developing and launching applications.

According to some embodiments, the virtual machine is associated with a Linux distribution kernel. In this case, there may be several hurdles to accomplish S310. For example, how can the migration platform securely access the virtual machine so that it may copy data? According to some embodiments, the virtual machine is accessed using ssh with key based access. For example, a public key (which can be freely available) may be stored in the ~/.ssh/authorized_keys config file on the virtual machine.

At S320, the migration platform may use a data duplicator command to stream block level copies of the virtual machine from the first cloud computing provider data center. According to some embodiments, the storage location is at the second cloud computing provider data center. Note that the automated migration platform tunes data duplicator block sizes to improve streaming performance. For example, once the migration platform gains access, can start copying data. An issue may then arise about where to store the copy. Since the platform is copying the entire disk, the storage in the virtual machine cannot be used. Instead, the migration platform needs to transmit the information securely either to provider B or to a storage facility that accessible from both provider A and provider B (as described in connection with FIG. 5). According to some embodiments, the migration platform may use the command dd which will allow it to make block level copies as well as tune the blocksize for performance. For example, the migration platform might make dd output on stdout and then pipe the data to a mutually accessible location. The system may use the objectstore on the either of the providers to store the streamed data. According to some embodiments, the system may use a staging virtual machine on provider B for storage. Because the system will require a staging virtual machine for further processing, it may transfer the image directly to it to keep things simple. To access the staging virtual machine, the virtual machine being migrated might use ssh-agent to forward the authentication and start creating a file the contains streamed data.

At S330, the system may compress the stream of block level copies before storing at a storage location. Note that at this point the system has a block level copy of the virtual machine but it will be the same size as the disk on the virtual machine. To solve this, some embodiments may pipe the stream of data from dd to the program gz (which will compress it) and then pipe it to the program responsible for transmission to the staging virtual machine or objectstore (ssh in the former case or a IaaS specific Command Line Interface ("CLI") in the latter).

At S340, the migration platform may automatically determine resource requirements, including a volume size, of the virtual machine. Details of one example implementing this determination are provided in connection with FIG. 8. At his point, the system needs to spawn a new virtual machine on provider B using the compressed data. At S350, the migration platform may create a new empty volume at a second cloud computing provider data center in accordance with the determined volume size (e.g., using automatically determined disk information).

At S360, the migration platform may extract the compressed stream of block level copies from the storage location into the new empty volume. The system may again use a pipeline of dd and gunzip to extract the data into the new volume as gunzip -c copy.gz | dd of=/dev/vdb bs=64M, where /dev/vdb is the fd for the new volume. The system may also use the automatically determined resource requirements to select an appropriate flavor for the new virtual machine and spawn a new virtual machine using an appropriate flavor and attach the new volume as the root disk. Thus, at S370 the system may spawn a new virtual machine at the second cloud computing provider data center in accordance with the determined resource requirements and having the new volume attached as a root volume. At S380, the migration platform may start the new virtual machine.

To perform these steps, by way of example, a user might create a staging virtual machine on AMAZON® Web Services ("AWS") and write a bash script which does the main work of connecting to the virtual machine and issuing commands to copy the disk, etc. This approach may also be used to migrate a virtual machine across PaaS providers thus demonstrating its generality. For example, a user might move an SUSE® Linux Enterprise System ("SLES") virtual machine from NEO (deployed on openstack) to a virtual machine on AWS or cloudfoundry.

Figure 4:
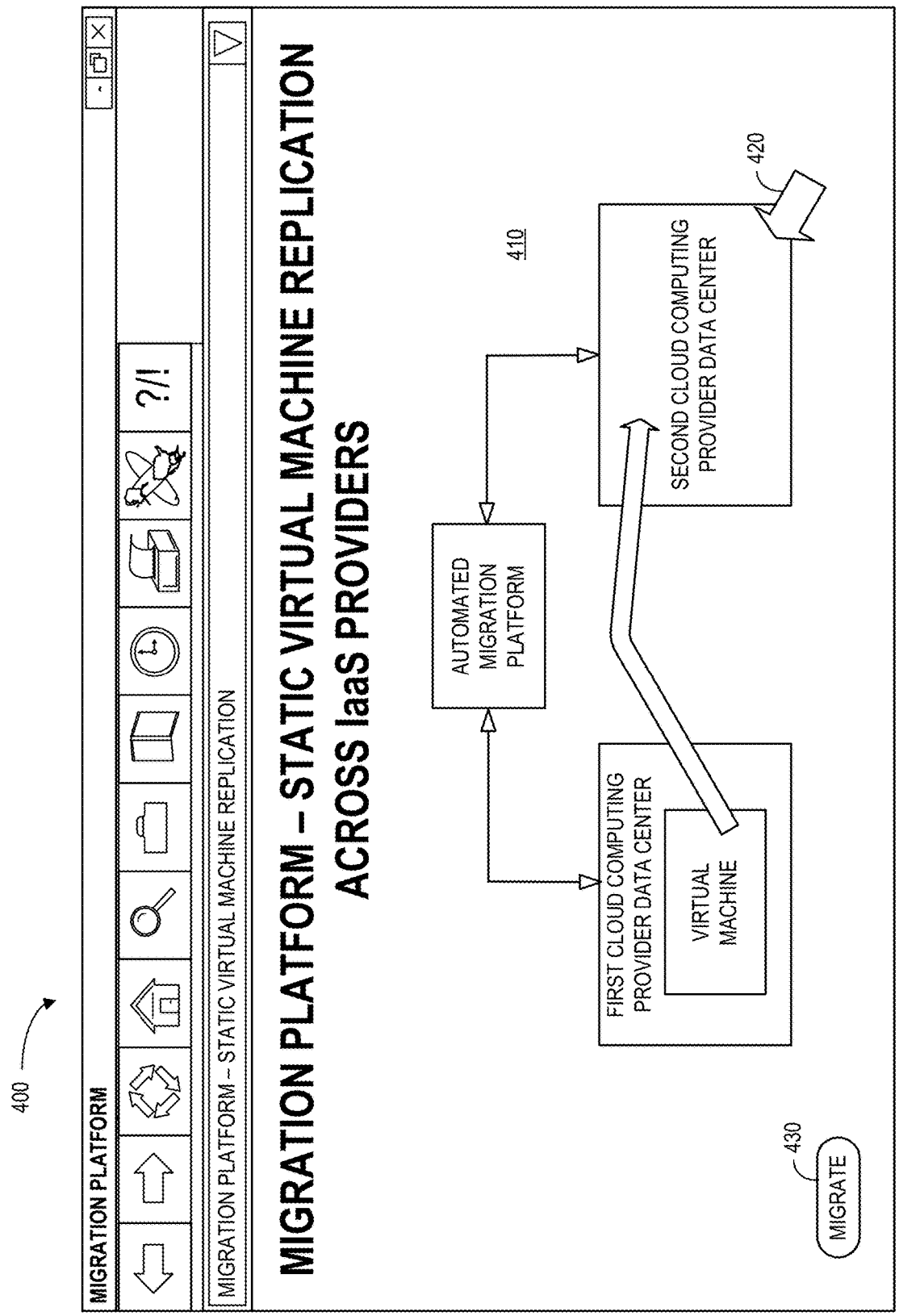
FIG. 4 is a human machine interface display according to some embodiments.

FIG. 4 is a human machine interface display 400 in accordance with some embodiments. The display 400 includes user-selectable options to "save and exit" 410 or "publish" 420 the contract. The display 400 includes a graphical representation 410 of elements of a system including an automated migration platform. Selection of an element (e.g., via a touch-screen or computer pointer 420) may result in display of a pop-up window containing various options (e.g., to view a migration status, resource requirements, etc.). The display 400 may also include a user-selectable "Migrate" icon to initiate an automated virtual machine migration process.

Figure 5:
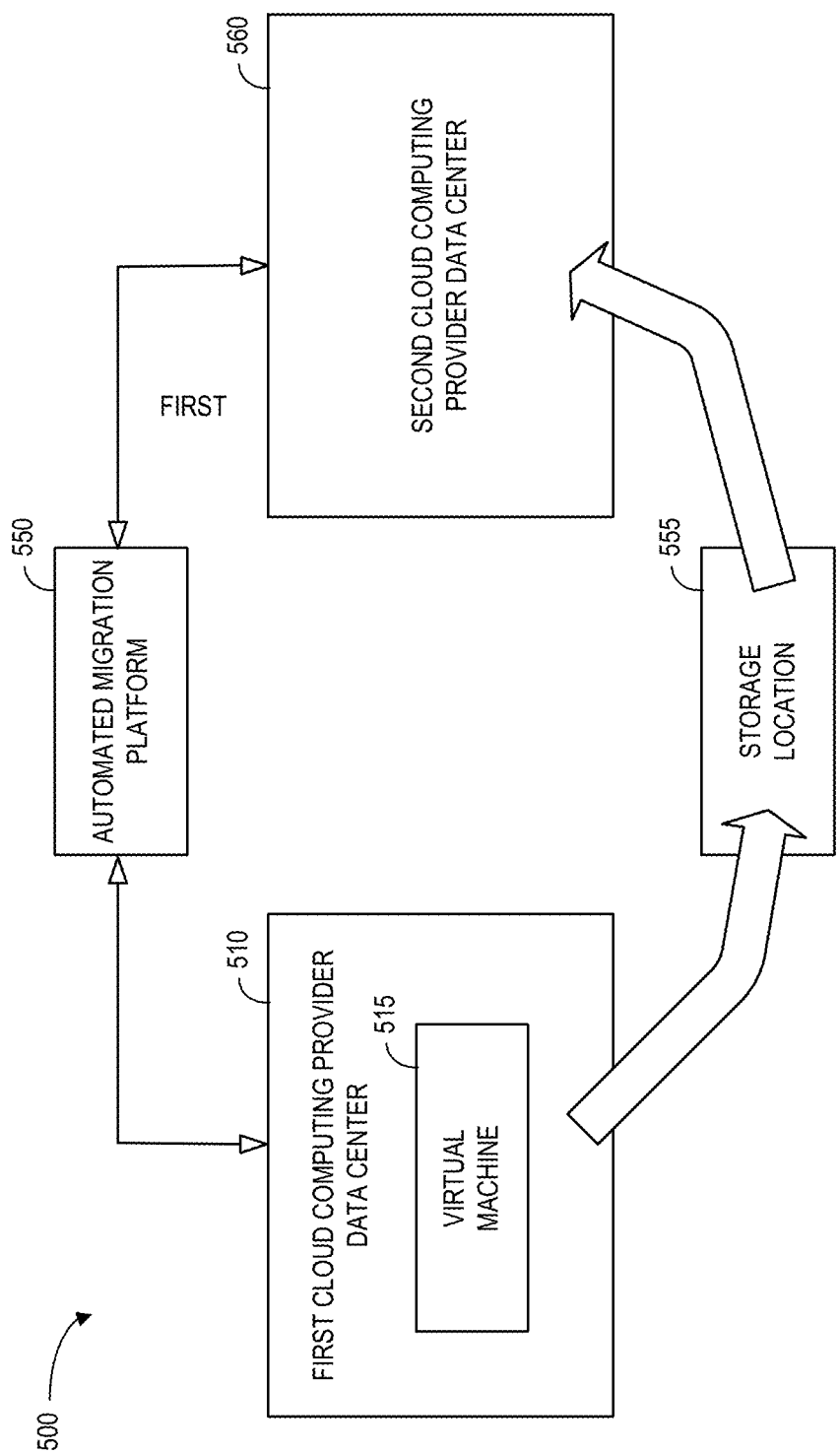
FIG. 5 is a high-level block diagram of a system including a storage location in accordance with some embodiments.

As described in connection with S320 of FIG. 3, a migration platform may use a data duplicator command to stream block level copies of a virtual machine from a first provider data center. In some cases, the steam is transmitted to a storage location that is mutually accessible by both the first and second cloud computing provider data centers. For example, FIG. 5 is a high-level block diagram of a system 500 including a storage location 555 in accordance with some embodiments. As before, the system 500 includes an automated migration platform 550 that facilitates the migration of a virtual machine 512 from a first cloud computing provider data center 510 to a second cloud computing data center 560. In this case, the storage location 555 used to store information before being finally moved to the second provider 560.

Figure 6:
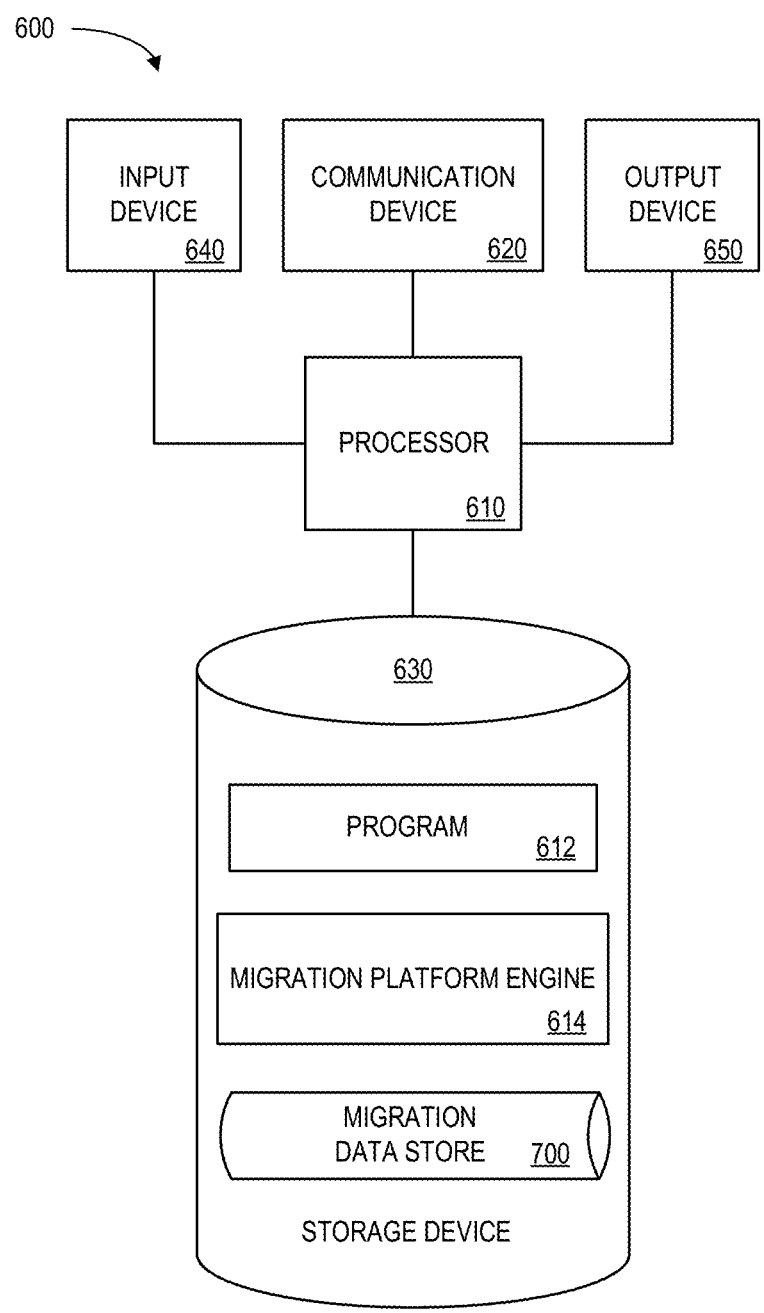
FIG. 6 is an apparatus or platform according to some embodiments.

Note that the embodiments described herein may also be implemented using any number of different hardware configurations. For example, FIG. 6 is a block diagram of an apparatus or platform 600 that may be, for example, associated with the systems 200, 500 of FIGS. 2 and 5, respectively (and/or any other system described herein). The platform 600 comprises a processor 610, such as one or more commercially available Central Processing Units ("CPUs") in the form of one-chip microprocessors, coupled to a communication device 660 configured to communicate via a communication network (not shown in FIG. 6). The communication device 660 may be used to communicate, for example, with one or more remote user platforms, central component platforms, etc. The platform 600 further includes an input device 640 (e.g., a computer mouse and/or keyboard to input migration parameters or scheduling data) and/an output device 650 (e.g., a computer monitor to render a display, transmit recommendations, and/or create reports about migrations). According to some embodiments, a mobile device, monitoring physical system, and/or PC may be used to exchange information with the platform 600.

The processor 610 also communicates with a storage device 630. The storage device 630 may comprise any appropriate information storage device, including combinations of magnetic storage devices (e.g., a hard disk drive), optical storage devices, mobile telephones, and/or semiconductor memory devices. The storage device 630 stores a program 612 and/or migration platform engine 614 for controlling the processor 610. The processor 610 performs instructions of the programs 612, 614, and thereby operates in accordance with any of the embodiments described herein. For example, the processor 610 may communicate with a first cloud computing provider that is executing a virtual machine. The processor 610 may access the first provider data center using a secure shell with key-based access by providing a public encryption key. The processor 610 may then use a data duplicator command to stream block level copies of the virtual machine (and the stream of block level copies may be compressed before being stored at a storage location). Resource requirements, including a volume size, of the virtual machine may be automatically determined by the processor 610 and used to create a new empty volume at a second cloud computing provider in accordance with the volume size. The compressed stream of block level copies from the storage location may be extracted into the new empty volume. The processor 610 may then spawn a new virtual machine at the second cloud computing provider in accordance with the determined resource requirements and having the new volume attached as a root volume. The new virtual machine may then be started by the processor 610.

The programs 612, 614 may be stored in a compressed, uncompiled and/or encrypted format. The programs 612, 614 may furthermore include other program elements, such as an operating system, clipboard application, a database management system, and/or device drivers used by the processor 610 to interface with peripheral devices.

As used herein, information may be "received" by or "transmitted" to, for example: (i) the platform 600 from another device; or (ii) a software application or module within the platform 600 from another software application, module, or any other source.

In some embodiments (such as the one shown in FIG. 6), the storage device 630 further stores a migration data store 700. An example of a database that may be used in connection with the platform 600 will now be described in detail with respect to FIG. 7. Note that the database described herein is only one example, and additional and/or different information may be stored therein. Moreover, various databases might be split or combined in accordance with any of the embodiments described herein.

Referring to FIG. 7, a table is shown that represents the migration data store 700 that may be stored at the platform 600 according to some embodiments. The table may include, for example, entries identifying virtual machines that have been automatically moved from a source provider to a target provider. The table may also define fields 702, 704, 706, 708, 710, 712, 714 for each of the entries. The fields 702, 704, 706, 708, 710, 712, 714 may, according to some embodiments, specify: a migration identifier 702, a virtual machine identifier 704, a source provider identifier 706, a target provider identifier 708, a migration date and time 710, and a status 712. The migration data store 700 may be created and updated, for example, when new virtual machines are initiated, when a migration is complete, etc.

The document line item identifier 702 might be a unique alphanumeric label or link that is associated with a particular migration event for the virtual machine identifier 704. The source provider identifier 706 and the target provider identifier 708 define where the virtual machine originated and eventual destination of the migration. As illustrated by the last two entries in the table 700, a migration might be "temporary" (e.g., the virtual machine might be moved from "P_104" to "P_105" to test the system and then be moved back to "P_104"). The migration date and time 710 may indicate when the migration as initiated, and the status 712 may indicate that the migration is complete, in process, pending (e.g., scheduled to be performed in the future).

Figure 8:
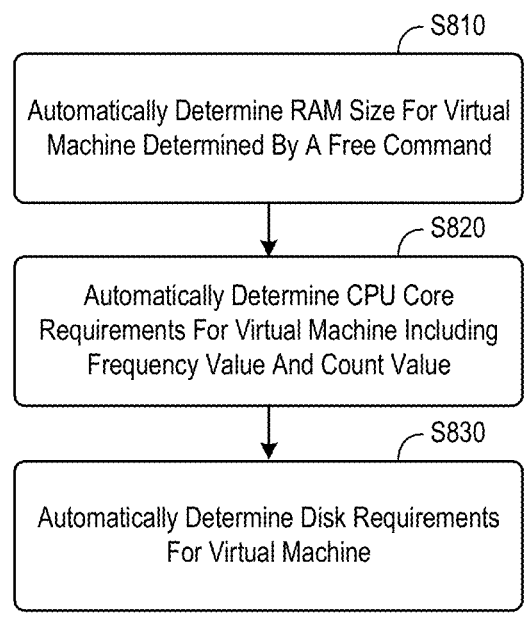
FIG. 8 is a method of determining resource requirements for a virtual machine according to some embodiments.

FIG. 8 is a method of determining resource requirements for a virtual machine according to some embodiments. At S810, automatically determined resource requirements of the virtual machine may include a Random-Access Memory ("RAM") size determined by a free command. For example, the migration platform might perform this by ssh-ing into it and using basic Linux commands and files such as command free to determine the RAM size.

At S820, the automatically determined resource requirements of the virtual machine may include Central Processing Unit ("CPU") core requirements including a frequency value and a count value. For example, the migration platform might perform this by using a text parsing tool such as grep to determine the content of the file /proc/cpuinfo and thus ascertain CPU core requirements (e.g., frequency and count). At S830, the automatically determined resource requirements of the virtual machine may include disk requirements. For example, the migration platform might perform this by ssh-ing into it and using basic Linux commands and files such as lsblk, blkid and/or df-hT to determine disk requirements.

Thus, embodiments may provide for the automatic migration of a virtual machine from one cloud computing provider to another in a fast, automatic, and accurate manner. Embodiments may work across various popular providers and for any new ones that might come up. According to some embodiments, a single approach works across various Linux distributions (since the system only uses the most basic utilities which are commonly available, and, as result, no OS dependent code or hacks are needed). Moreover, the solution may be extended to migrate virtual machines across PaaS providers.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 9:
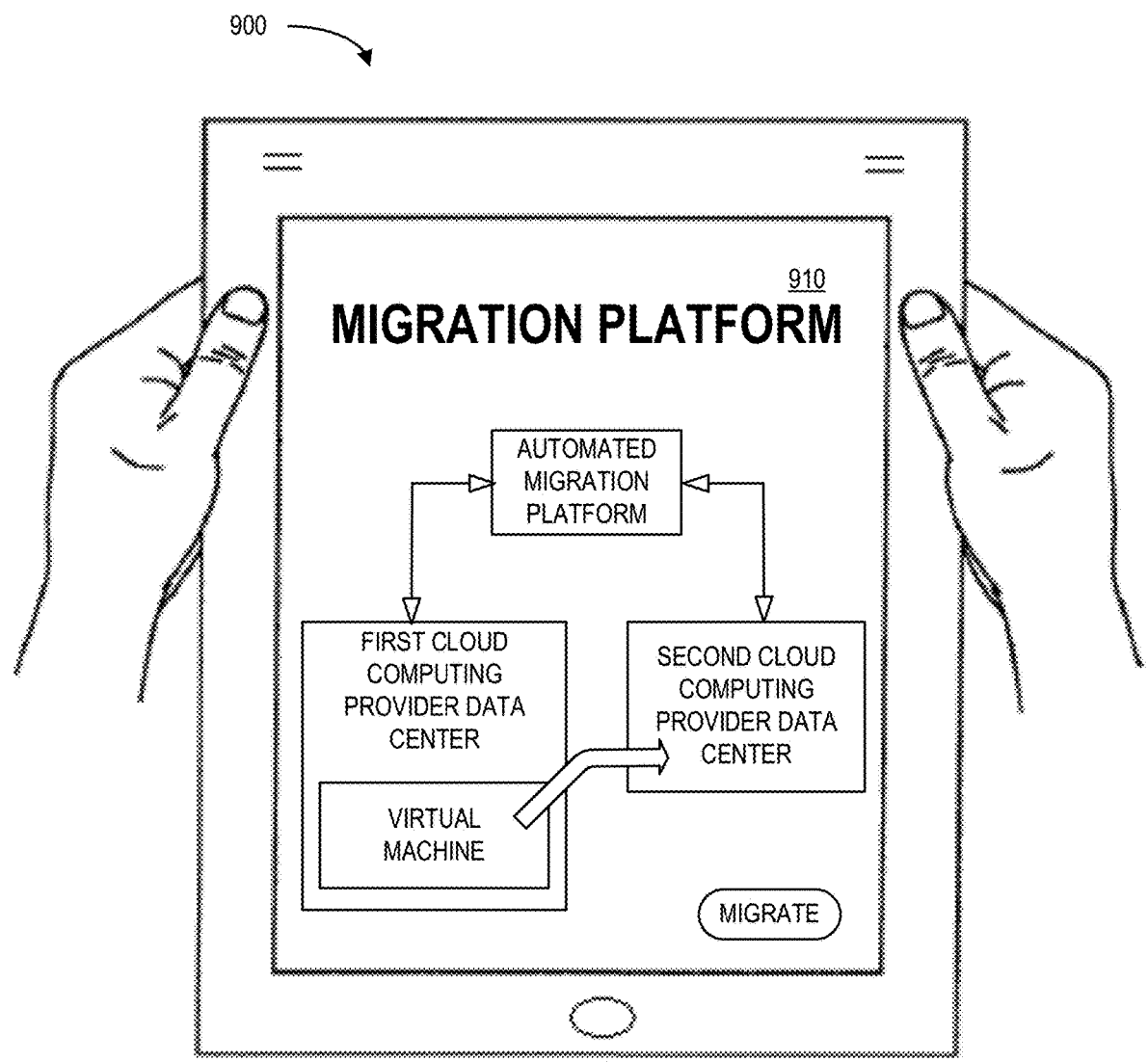
FIG. 9 illustrates a tablet computer in according with some embodiments.

Although specific hardware and data configurations have been described herein, note that any number of other configurations may be provided in accordance with some embodiments of the present invention (e.g., some of the information associated with the databases described herein may be combined or stored in external systems). Moreover, although some embodiments are focused on particular types of item and contracts, any of the embodiments described herein could be applied to other types of items and contracts. Moreover, the displays shown herein are provided only as examples, and any other type of user interface could be implemented. For example, FIG. 9 shows a tablet computer 900 rendering a display 910 that shows migration system components that may be adjusted (e.g., via a touch-screen) and/ initiated by a user.

Some embodiments may not migrate the in-memory state and running processes of a virtual machine. Moreover, some embodiments are directed to Linux-based virtual machines. Some additional IaaS-based entities (e.g., security groups and IP addresses) might not be replicated but these issues may be easily addressed. Some embodiments assume that the OS in the virtual machine is current enough with a decent kernel version so that it can work with all IaaS providers seamlessly, however, embodiments might make some exceptions like updating the kernel and bootloader.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A system comprising:
   a first cloud computing provider data center executing a virtual machine;
   a second cloud computing provider data center; and
   an automated migration platform, coupled to the first and second cloud computing data centers, adapted to perform the following:
   (i) arrange to access the first cloud computing provider data center using a secure shell with key-based access by providing a public encryption key, (ii) use a data duplicator command to stream block level copies of the virtual machine from the first cloud computing provider data center, (iii) compress the stream of block level copies before storing at a storage location, (iv) automatically determine resource requirements of the virtual machine, including a volume size, (v) create a new empty volume at the second cloud computing provider data center in accordance with the determined volume size, (vi) extract the compressed stream of block level copies from the storage location into the new empty volume, (vii) spawn a new virtual machine at the second cloud computing provider data center in accordance with the determined resource requirements and having the new volume attached as a root volume, and (viii) start the new virtual machine.

2. The system of claim 1, wherein at least one of the first and second cloud computing data provider data center is associated with at least one of: (i) an Infrastructure-as-a-Service ("IaaS") data center, and (ii) a Platform-as-a-Service ("PaaS") data center.

3. The system of claim 1, wherein the storage location is at the second cloud computing provider data center.

4. The system of claim 1, wherein the storage location is mutually accessible by both the first and second cloud computing provider data centers.

5. The system of claim 1, wherein the automated migration platform tunes data duplicator block sizes to improve streaming performance.

6. The system of claim 1, wherein the automatically determined resource requirements of the virtual machine include a Random-Access Memory ("RAM") size determined by a free command.

7. The system of claim 1, wherein the automatically determined resource requirements of the virtual machine include Central Processing Unit ("CPU") core requirements including a frequency value and a count value.

8. The system of claim 1, wherein the virtual machine is associated with a Linux distribution kernel.

9. A computer-implemented method associated with a first cloud computing provider data center executing a virtual machine, comprising:

arranging, by an automated migration platform, to access the first cloud computing provider data center using a secure shell with key-based access by providing a public encryption key;

using a data duplicator command to stream block level copies of the virtual machine from the first cloud computing provider data center;

compressing the stream of block level copies before storing at a storage location;

automatically determining resource requirements of the virtual machine, including a volume size;

creating a new empty volume at a second cloud computing provider data center in accordance with the determined volume size;

extracting the compressed stream of block level copies from the storage location into the new empty volume;

spawn a new virtual machine at the second cloud computing provider data center in accordance with the determined resource requirements and having the new volume attached as a root volume; and starting the new virtual machine.

10. The method of claim 9, wherein at least one of the first and second cloud computing data provider data center is associated with at least one of: (i) an Infrastructure-as-a-Service ("IaaS") data center, and (ii) a Platform-as-a-Service ("PaaS") data center.

11. The method of claim 9, wherein the storage location is at the second cloud computing provider data center.

12. The method of claim 9, wherein the storage location is mutually accessible by both the first and second cloud computing provider data centers.

13. The method of claim 9, wherein the automated migration platform tunes data duplicator block sizes to improve streaming performance.

14. The method of claim 9, wherein the automatically determined resource requirements of the virtual machine include a Random-Access Memory ("RAM") size determined by a free command.

15. A non-transitory, computer readable medium having executable instructions stored therein, the medium comprising:

instructions to arrange, by an automated migration platform, to access the first cloud computing provider data center using a secure shell with key-based access by providing a public encryption key;

instructions to use a data duplicator command to stream block level copies of the virtual machine from the first cloud computing provider data center;

instructions to compress the stream of block level copies before storing at a storage location;

instructions to automatically determine resource requirements of the virtual machine, including a volume size;

instructions to create a new empty volume at a second cloud computing provider data center in accordance with the determined volume size;

instructions to extract the compressed stream of block level copies from the storage location into the new empty volume;

instructions to spawn a new virtual machine at the second cloud computing provider data center in accordance with the determined resource requirements and having the new volume attached as a root volume; and instructions to start the new virtual machine.

16. The medium of claim 15, wherein at least one of the first and second cloud computing data provider data center is associated with at least one of: (i) an Infrastructure-as-a-Service ("IaaS") data center, and (ii) a Platform-as-a-Service ("PaaS") data center.

17. The medium of claim 15, wherein the automatically determined resource requirements of the virtual machine include Central Processing Unit ("CPU") core requirements including a frequency value and a count value.

18. The medium of claim 15, wherein the virtual machine is associated with a Linux distribution kernel.

19. The medium of claim 15, wherein the automatically determined resource requirements of the virtual machine include a Random-Access Memory ("RAM") size determined by a free command.

20. The medium of claim 15, wherein the automatically determined resource requirements of the virtual machine include Central Processing Unit ("CPU") core requirements including a frequency value and a count value.

* * * * *